United States Patent [19]

Temple

[11] Patent Number: 5,325,990
[45] Date of Patent: Jul. 5, 1994

[54] CONTAINER SUPPORT

[76] Inventor: Jeffrey L. Temple, P.O. Box 122, Fredericktown, Ohio 43017-9355

[21] Appl. No.: 93,090

[22] Filed: Jul. 16, 1993

[51] Int. Cl.$^5$ .............................................. A47G 23/00
[52] U.S. Cl. ...................................... 220/628; 248/151
[58] Field of Search .............. 220/628, 629, 630, 636, 220/737; 248/151

[56] References Cited

U.S. PATENT DOCUMENTS

| | | | |
|---|---|---|---|
| 692,103 | 1/1902 | Bailey | 220/630 X |
| 2,683,014 | 7/1954 | Sumen et al. | 248/150 |
| 2,837,305 | 6/1958 | Andren | 248/148 |
| 3,608,600 | 9/1971 | Lehrman | 220/630 X |
| 3,792,795 | 2/1974 | Sikora | 220/628 X |
| 4,398,690 | 8/1983 | Rutledge | 248/150 |
| 4,505,408 | 3/1985 | Sagol | 222/185 |
| 4,903,923 | 2/1990 | Krentel | 248/151 X |
| 4,962,906 | 10/1990 | Fatool et al. | 248/148 |

Primary Examiner—Steven M. Pollard
Attorney, Agent, or Firm—Watkins, Dunbar & Pollick

[57] ABSTRACT

A container support has two legs attached on opposite sides of a container with a third leg attached to one of the legs attached to the container. The third leg pivots to minimize its projection when carrying the container from place to place with the support attached. By making the pivoting leg slightly longer than the leg to which it is attached, the third leg can be set in its extended position by merely rotating the container. Attaching brackets provide for the correct leg angle and easy attachment and detachment of the legs using a force fit between the back of the bracket and the container wall. The use of square tubing and mating attachment bracket for the container-attached legs maintains the correct angles for the support structure. Preferably the two container-attached legs are attached below the points of attachment of the container handle, which in conjunction with the pivoting third leg, minimizes outward projection of the support thereby preventing damage to nearby surfaces and objects when the container is carried from place to place with the support attached.

20 Claims, 2 Drawing Sheets

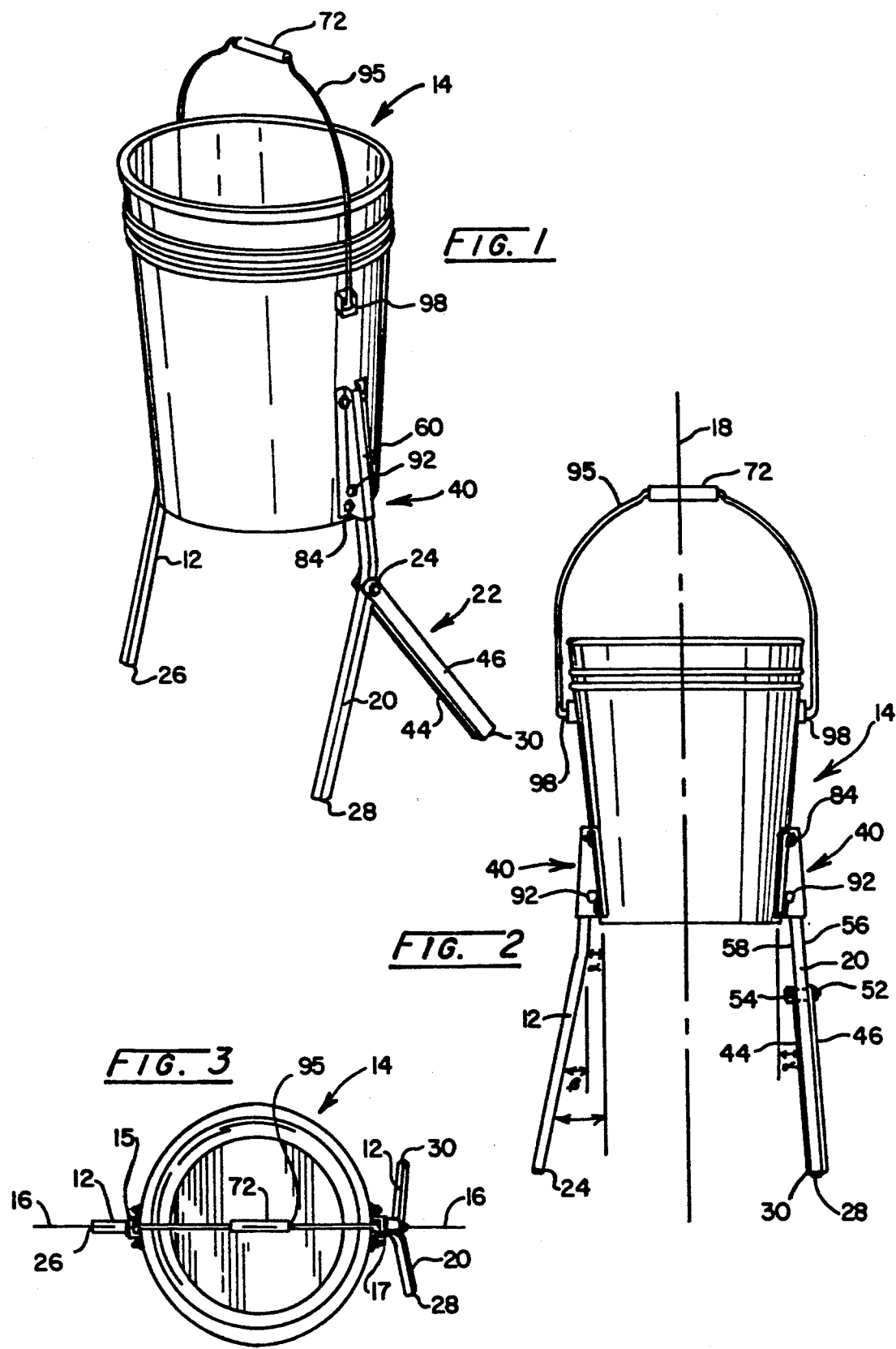

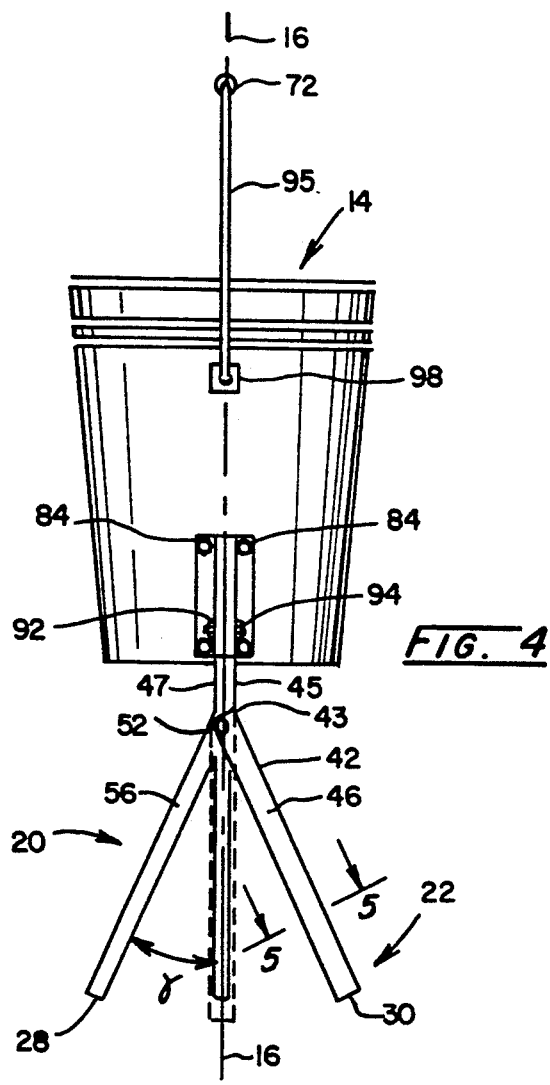
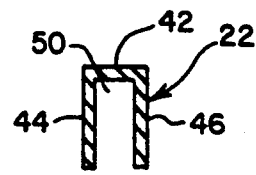
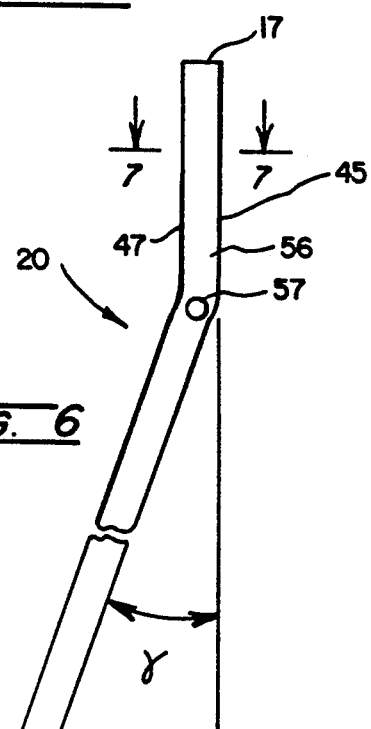
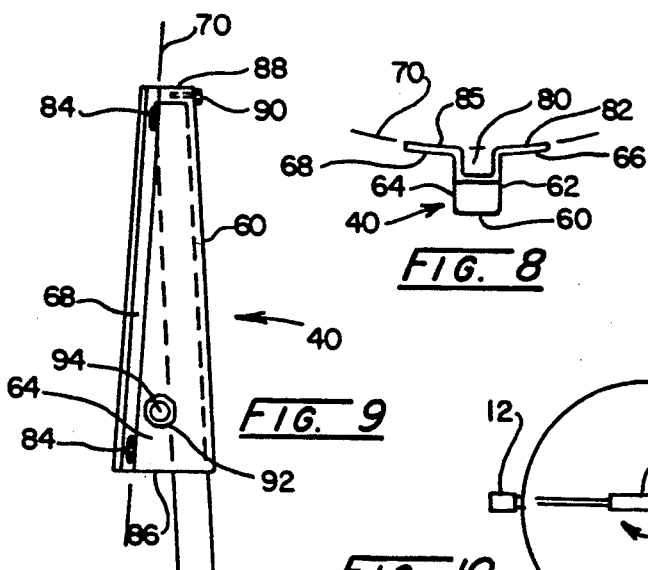
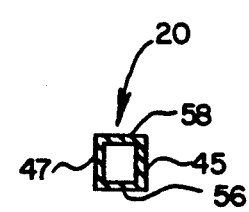
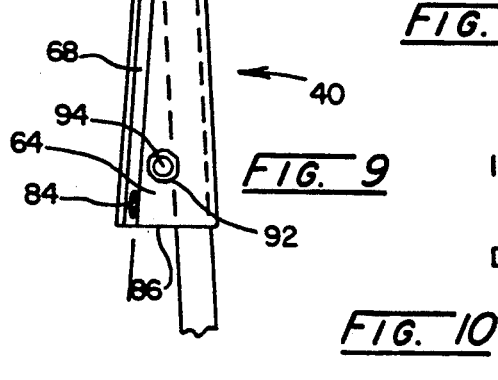
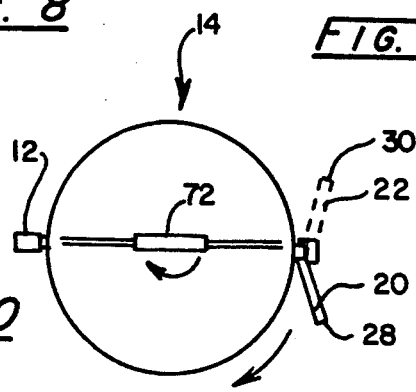

CONTAINER SUPPORT

BACKGROUND OF THE INVENTION

1. Field of the Invention

This invention relates to supports. More particularly, the invention relates to supports for containers such as buckets and pails.

2. Background of the Invention

A wide variety of supports have been developed for containers used in a variety of situations. For example, U.S. Pat. Nos. 2,837,305 to Andren and 4,962,906 to Fatool et al are directed to supports for holding cans and pails on sloping surfaces such as roofs and ladder structures. U.S. Pat. No. 4,505,408 to Sagol is directed to a set of collapsible legs for elevating a beverage container so as to allow a cup to be placed below the container spigot while at the same time avoiding having to place the beverage container at the edge of a table or other supporting surface thereby reducing the possibility of accidental displacement of the container and/or spillage of its contents onto a floor or patio surface.

U.S. Pat. No. 4,398,690 to Rutledge discloses a tripod supported platform with retainers for holding a paint bucket or a paint roller tray to the platform. Sumen et al, U.S. Pat. No. 2,683,014, discloses a utility pail holder that consists of a band that circumscribes the outer wall of the pail and has depending arms that hook over the bottom lip of the pail with pivoting feet attached to the depending arms. The feet require individual and direct manual intervention in raising or lowering each of them into position.

The ubiquitous plastic pail commonly associated with wall joint compounds, food packaging, paints, and so forth, has spawned a growing variety of secondary uses for these containers, including use as tool caddies, to carry fishing tackle, as wash buckets, etc. However, because these containers are typically set on the floor, there is a considerable amount of bending on the part of the user in placing items into or taking them out of or otherwise using the pail. As a consequence, there is a definite need to place the container on a support that reduces the bending effort and thereby makes it easier to use. There is also a need for a support that is easy to attach and detach from the container, easy to move from place to place when attached to the container, and easy to position on the supporting surface.

SUMMARY OF THE INVENTION

In view of these needs, it is an object of this invention to provide a support that will hold a container, such as a pail, bucket or the like, in a position elevated above a supporting surface so as to reduce the amount of bending required to put items in or take objects out of or otherwise use the contents of the container. Another object of this invention is to provide a support that will keep the container from contacting surfaces that may produce unwanted effects upon the container, its contents or both, such as muddy, wet, damp, cold or hot surfaces.

Another object of this invention to provide a support that is readily attached to and detached from the container. A further object of this invention is to provide a support that is simple in design so as to reduce fabricating and construction costs. Another object is to provide a support that avoids damage to walls, doors, furniture, and similar surfaces from protruding support members when the container is moved with the support attached.

A further object of this invention to provide support members that are easily positioned and which do not have to be directly manipulated when the container is set in place.

One of the features of this invention is the use of only two legs that are attached on opposite sides of the container rather than the usual tripod support in which at least three legs are attached to the container. The use of only two, container-attached legs has the advantage of preventing nicks and scraps to furniture, doors, walls, etc. when the device is carried with the support attached, especially when used with the additional features described below.

In its basic form, the support of this invention has three legs, each with a first and second end. Two of the legs are attached on opposite sides of the container, while a third leg is attached to one of the legs attached to the container. The legs are attached in such a manner as to form a triangular area beneath the container.

Specifically, a first leg is attached at its first end to the container. This leg extends downward and outward away from the container in a vertical plane that passes through the vertical centerline of the container. A second leg is attached at its first end on the other side of the container directly opposite the first leg. As with the first leg, the second leg initially also extends downward and outward away from the container in the vertical plane. However, as it continues to extend downward, it turns so as to extend away from the vertical plane. A third leg is attached at its first end to the second leg so that the third leg extends down and away from the plane but in a direction away from the second (non-attached) end of the second leg. The second (non-attached) ends of the first, second, and third legs define a triangular area on the support surface over which the center of gravity of the container is supported. Although the support is typically used for a container such as a bucket or pail it can also be used for other shapes of containers such as boxes and the like.

Another feature of this invention is the use of a pivotally attached third leg. This further reduces the possibility of damaging furniture, doors, walls, and other nearby objects when the container is carried with its support legs attached. When the container is lifted, the pivotally attached third leg drops down to minimize its outward projection.

Another feature of the invention is the attachment of the first and second legs to the container below the points of attachment of the container handle to the container. The invention can be used with open containers where the legs are attached directly below the pivot points, that is, on the same surface, and also with closed containers such as tool and tackle boxes where the handle pivot points are typically attached to the top of the container with the legs attached at the sides. In more general terms, this feature of the invention is described as having the first and second legs located in the same vertical plane as the plane passing through the pivoting attachment points of the container handle and the vertical centerline of the container. This has the advantage of tending to reduce the outward projection of the legs, especially when the container handle is held so that the second (non-attached) end of the second leg extends inward toward the path of travel of the person carrying the container. When carried in this position, the third pivotally attached leg drops down into a non-protruding position thereby minimizing damage to nearby objects and structures when carrying the container with the attached support.

Another feature of this invention is the use of a pivotally attached third leg that is slightly longer than the second leg. That is, the second end of the third leg extends beyond the second end of the second leg when the third leg is swung about its pivot point against the second leg. The slightly extending third leg has the advantage of allowing the individual carrying the pail to set the third leg on the floor and then rotate the container by means of its handle so as to bring the third leg into a fully extended position. This eliminates the need of having to bend over and manipulate the third leg into its extended position.

Another feature of this invention is the use of a bracket for attaching the first and second legs to the container. The bracket has a back and two attached opposing first and second sides that form an internal U-shaped channel. First and second flanges extend outward from their respective attachment to the first and second sides of the bracket. The flanges have interior surfaces that conform in shape with the exterior portion of the container to which they are fastened. The flanges are attached to the container with adhesive or suitable fasteners such as nuts and bolts. When the bracket is attached to the container, a portion of the outer surface of the container and the U-shaped channel of the bracket form a tubular opening for receiving one of the first ends of the first and second legs. A tapered tubular opening that is wider at the bottom provides the proper angle at which the legs slope away from the container. A nut and bolt, dimple, constriction, spring or similar adaption maintains the leg against the back of the bracket so as to maintain the leg in the proper down and outward angle.

Another feature is the use of a bracket for attaching the first and second legs to the container with a force fit.

The top portion of the previously noted taper is slightly smaller than the first end of the leg so that a force fit is achieved between the outer surface of the container and the back of the bracket. This is especially effective when the container is made from a resilient material such as plastic and has the advantage of providing a readily attached and detached support.

Another feature is a stop provided at the interior top of the bracket. The use of a stop has the advantage of preventing the leg from projecting beyond the bracket and provides for a support that maintains a level container.

Another feature of this invention is the use of square tubular material for the first and second legs. When used with the appropriate bracket, this has the advantage of allowing the legs to be quickly positioned in the bracket with correct alignment of all support components and angles.

The foregoing and other advantages of the invention will become apparent from the following disclosure in which one or more preferred embodiments of the invention are described in detail and illustrated in the accompanying drawings. It is contemplated that variations in procedures, structural features and arrangement of parts may appear to a person skilled in the art without departing from the scope of or sacrificing any of the advantages of the invention.

BRIEF DESCRIPTION OF THE DRAWINGS

FIG. 1 is a perspective view of the invention.
FIG. 2 is a front view of the embodiment of FIG. 1.
FIG. 3 is a top plan view of the embodiment of FIG. 1.
FIG. 4 is a side view of the embodiment of FIG. 1.
FIG. 5 is a cross section taken along line 5—5 of FIG. 4.
FIG. 6 is a side view of a supporting leg of the embodiment of FIG. 1.
FIG. 7 is a cross section taken along line 7—7 of FIG. 6.
FIG. 8 is a partial top plan view showing a portion of the container wall and leg bracket.
FIG. 9 is a partial side view showing the bracket and top portion of a leg in a force fit with the bracket and container wall.
FIG. 10 is a top plan schematic view showing the rotation of said container to position the pivoting leg of this invention.

In describing the preferred embodiment of the invention which is illustrated in the drawings, specific terminology is resorted to for the sake of clarity. However, it is not intended that the invention be limited to the specific terms so selected and it is to be understood that each specific term includes all technical equivalents that operate in a similar manner to accomplish a similar purpose.

Although a preferred embodiment of the invention has been herein described, it is understood that various changes and modifications in the illustrated and described structure can be affected without departure from the basic principles that underlie the invention. Changes and modifications of this type are therefore deemed to be circumscribed by the spirit and scope of the invention, except as the same may be necessarily modified by the appended claims or reasonable equivalents thereof.

DETAILED DESCRIPTION OF THE INVENTION AND BEST MODE FOR CARRYING OUT THE PREFERRED EMBODIMENT

As seen in FIGS. 1-3, this invention is a support for containers such as pails, buckets, trays, boxes and the like. In its basic form, the support has a first leg 12 with a first end 15 attached to a container 14. Leg 12 extends downward and outward away from container 14 in a vertical plane 16 that passes through the vertical center line 18 of container 14. A second leg 20 has a first end 17 attached to the container 14 opposite the first leg 12 and extends downward and outward away from the container 14 in vertical plane 16 and then downward and outward away from vertical plane 16. A third leg 22 has a first end 24 attached to the second leg 20. The third leg 22 extends downward and away from the vertical plane 16 and also downward and away from the second (unattached) end 28 of leg 20. The second ends 26, 28 and 30 of legs 12, 20 and 22, respectively, define a triangular shaped area over which a center of gravity of container 14 is supported.

In FIG. 2, it is seen that legs 12 and 20 extend away from the centerline 18 of the bucket at an angle $\alpha$. To provide an even larger triangular base over which the center of gravity of container 14 is supported, first leg 12 can be bent to extend even further away from the container centerline 18 as, for example, by an additional angle $\beta$.

As seen in FIGS. 4 and 6, the second leg 20 is bent to extend away from plane 16 at an angle $\gamma$. By using square tubular first and second legs, 12 and 20, respectively (FIG. 7) with an appropriate attaching means, the first and second legs, 12 and 20, can be made and attached to the container 14 with relative ease. Thus the first leg 12 is attached to the container 14 with the bend extending the leg in plane 16. The second leg 20 is attached to the container 14 by rotating leg 20 90° so that the bend is located so that the end 28 extends downward and away from plane 16. Preferably legs 12 and 20 are made to the same length in which case angle $\gamma$ is made somewhat larger than angle $\beta$, e.g., about 20° when angle $\beta$ is 15°. Alternatively, if angles $\beta$ and $\gamma$ are made equal, then the first leg must be made somewhat longer than the second leg. It is to be understood that although the relative angles and lengths of first and second legs are important to the operation of the invention, the mentioned angles and relative lengths are used only as an example and are not limiting.

As shown In FIG. 5, the third leg 22 is a U-channel leg having a back 42 with two attached and opposing sides 44 and 46 that define channel 50. In FIGS. 1–2, it can be seen that the sides 44 and 46 of leg 22 are sufficiently far apart to receive at least a portion of second tubular leg 20. To allow third leg 22 to pivot, opposing apertures 57 are formed in sides 44 and 46 of leg 22 and sides 56 and 58 of second leg 20 (FIG. 6) so as to align with each other and allow the insertion of pivot pin 54. Pivot pin 54 is secured with suitable means such as with nut 52. As shown in FIG. 4, the pivot pin 54 (behind nut 52) allows third leg 22 to rotate from its extended position to a vertical position (shown in phantom) when container 14 is lifted from a supporting surface.

By making third leg 22 slightly longer than second leg 20, that is, the second end 30 of leg 22 extends beyond the second end 28 of leg 20 when leg 20 is received in channel 50 of leg 22, it is possible to rotate third leg 22 to its extended position without having to bend over and directly extend it. This is illustrated schematically in FIG. 10. The container 14 is lowered until the end 30 of leg 22 contacts the supporting surface. The container handle grip 72 is rotated so as to move second leg 20 away from third leg 22 leaving leg 22 in its fully extended position when the second end 28 of leg 20 is allowed to contact the supporting surface. As seen In FIG. 4, the end 43 of back 42 of leg 22 contacts side 45 of leg 20 to prevent further outward rotation of leg 22.

First and second legs 12 and 20 can be attached to the container in a wide variety of way. This invention contemplates permanent attachment of the legs to the container, an attaching mechanism that is integral with the container itself such as slots or passages molded into the container to receive the legs, and preferably for converted containers, i.e., containers originally used for other purposes, a bracket that is easily attached to the container and that allows for rapid and easy attachment and detachment of legs 12 and 20.

The preferred bracket is shown in FIGS. 8 and 9. Bracket 40 has a back 60, a first side 62 and a second side 64 with sides 62 and 64 attached to the back and opposite each other to form an internal U-shaped channel 80. Side 62 has an attached first flange 66 that extends outward from first side 62. Similarly, side 64 has an attached second flange 68 that extends outward from second side 64. Flanges 66 and 68 have interior surfaces 82 and 85 that conform to the outer surface 70 of container 14. The flanges 66 and 68 can be secured to the container in a variety of ways including with the use of adhesives and fasteners such as rivets and nuts and bolts 84. When bracket 40 is fastened to the container surface 70 a tubular opening is formed from the internal U-shaped channel 80 and container surface 70 that receives the first end (15 or 17) of the first or second legs, 12 or 20.

As seen in FIG. 9, the back 60 of bracket 40 extends away from the surface 70 to from a tapered tubular opening that is wider in a downward direction. That is, bracket 40 has a wider base 86 than top 88. In order to maintain the angle $\alpha$ at which legs 12 and 20 initially extend away from the centerline 18 of container 14 (FIG. 2), legs 12 and 20 must be positioned against the back 60 of the bracket 40. The can be accomplished in a variety of ways including dimples, springs, side 62 or 64 constriction, and the nut 92 and bolt 94 shown in FIG. 9. Opposing apertures are placed in the lower portion of opposing sides 62 and 64, bolt 94 inserted therethrough, and secured in place with nut 92. As seen in FIG. 9, bolt 94 maintains the upper portion of leg 12 or leg 20 (shown in phantom) in contact with back 60 of bracket 40.

The first end of either of legs 12 or 20, i.e., ends 15 or 17, respectively, is secured in bracket 40 by means of a force fit of the end between the outer surface 70 of the container 14 and the back 60 of the bracket 40. The force fit is especially effective when the container is made of a resilient material such as plastic. Of course a wide variety of other securing methods and devices may be used to secure the legs to the bracket including dimples and projections, pins inserted through aligning apertures in the bracket and leg, and other methods well known in the art.

As seen in FIG. 9, a stop 90 prevents the first ends of either leg 12 or 20 from extending into bracket 40 more than a predefined distance. Stop 90 insures that container 40 is maintained in a level position with respect to the supporting surface.

As shown in FIGS. 1–4 and 10, the amount of outward projection of the supporting legs and especially leg 22 is minimized when legs 12 and 20 are attached below the pivot points 98 of handle 95. That is, the vertical plane 16 through center line 18 passes through the opposing pivot points 98 of handle 95 and the container attachment points of the first ends of legs 12 and 20 (FIG. 3)

As seen in FIG. 4, a person standing to the left of container 14 and picking it up by handle grip 72 will be able to carry the container 14 with its attached support in a position that minimizes outward leg projection so as to avoid damage to walls, doors, furniture and other objects that might come in contact with a projecting support. As can be seen, leg 22 swings down (shown in phantom) to minimize possible damaging contact with nearby objects.

The container support stand of this invention can be modified and used in many ways to accommodate the specific needs of its users. Carpenters can use it as a tool caddie feeling confident of avoiding unwanted damage to finish work when carrying the container with its stand attached. Three or four of these containers and stands can be used to support a sheet of plywood that serves as a work surface or as saw horses. Appropriate gaskets and sealers can be used with the attachment brackets to make the container water proof for use as a bait bucket, wash or paint pail or otherwise accommodate the need for a supported liquid container. Telescoping legs can be used to adjust the height of the container. These and many other modifications of the basic invention will be readily apparent to those skilled in the art and are within the scope of this invention.

Indeed and as noted, it is possible that changes in configurations to other than those shown could be used. However, that which is shown is preferred and typical. As has been noted, various means of fastening the components together may be used without departing from the spirit and scope of this invention. It is therefore understood that although the present invention has been specifically disclosed with the preferred embodiment and examples, modifications to the design concerning sizing and shape will be apparent to those skilled in the art and such modifications and variations are considered to be equivalent to and within the scope of the disclosed invention and the appended claims.

I claim:

1. A container support comprising:
   a. a first leg having a first end and a second end with said first end attached to a container and said first leg extending downward and outward away from said container in a vertical plane passing through a vertical center line of said container;
   b. a second leg having a first end and a second end with said first end attached to said container opposite said first leg and said second leg extending first downward and outward away from said container in said vertical plane and then downward and away from said vertical plane; and
   c. a third leg having a first end and a second end with said first end of said third leg attached to said second leg and said third leg extending downward and away from said vertical plane and said second end of said second leg.

2. The container support according to claim 1 wherein said third leg is pivotally attached to said second leg.

3. The container support according to claim 2 wherein said second leg is a square tubular second leg.

4. The container support according to claim 3 wherein said third leg is a U-channel third leg having a back with two attached opposing sides that define a channel that receives a portion of said square tubular second leg.

5. The container support according to claim 4 wherein said U-channel third leg is pivotally attached to said square tubular second leg by means of a pivot pin that passes through opposing apertures formed in said two opposing sides of said U-channel third leg and opposing apertures formed in two opposing sides of said square tubular second leg.

6. The container support according to claim 5 wherein an end of said back of said U-channel third leg contacts a side of said square tubular second leg when said U-channel third leg is in an extended position.

7. The container support according to claim 2 wherein a length of said third leg below said pivotal attachment is longer than a portion of said second leg below said pivotal attachment of said third leg.

8. The container support according to claim 1 wherein said first leg is bent to extend further away from said container in said vertical plane.

9. The container support according to claim 1 wherein each of said first and said second legs is attached to said container by means of a bracket, said bracket comprising:
   a. a back;
   b. a first side;
   c. a second side; with
   d. said first and said second sides attached opposite each other and to said back to form an internal U-shaped channel;
   e. a first flange attached and extending outwardly from said first side; and
   f. a second flange attached extending outwardly from said second side, with
      1) said first and second flanges having an inner surface that conforms with an outer surface of said container;
      2) said first and second flanges being attached to said container with fastening means; and
      3) said internal U-shaped channel said bracket and a portion of said outer surface of said container defining an tubular opening for receiving one of said first ends of said first and said second legs.

10. The container support according to claim 9 wherein said back of said bracket extends away from said surface of said container to form a tapered tubular opening that is wider in a downward direction.

11. The container support according to claim 10 with said bracket having means for maintaining said upper portion of said first and second legs in contact with said back side of said bracket.

12. The container support according to claim 11 wherein said means for maintaining said upper portion of said first and second legs in contact with said first side of said bracket is a bolt inserted through opposing apertures in lower portions of said first and second sides of said bracket and secured with a nut.

13. The container support according to claim 12 wherein said upper portion of said first and second legs is secured in said bracket by means of a force fit when inserted between said portion of said outer surface of said container and said back of said bracket.

14. The container support according to claim 9 with said bracket having a stop for one of said first and said second legs.

15. The container support according to claim 1 wherein said vertical plane also contains opposing pivotal attachment points of a pivoting handle attached to said container.

16. A container and support therefor comprising:
   a. a container;
   b. a first leg having a first end and a second end with said first end attached to said container and said first leg extending downward and outwardly away from said container in a vertical plane passing through a vertical center line of said container;
   c. a second leg having a first end and a second end with said first end attached to said container opposite said first leg and said second leg extending first downward and outwardly away from said container in said vertical plane and then downward and away from said vertical plane; and
   d. a third leg having a first end and a second end with said first end of said third leg attached to said second leg and said third leg extending downward and away from both said vertical plane and said second end of said second leg.

17. The container and support therefor according to claim 16 wherein said third leg is pivotally attached to said second leg.

18. The container and support therefor according to claim 17 wherein a length of said third leg below said pivotal attachment is longer than a portion of said second leg below said pivotal attachment of said third leg.

19. The container and support therefor according to claim 16 with said container having a handle with pivotal attachment points located on opposite sides of said container and in said vertical plane.

20. A support for a container with a pivoting handle attached at pivot points on opposite sides of said container, said support comprising:
   a. a first leg having a first end and a second end with said first end attached to said container and said first leg extending downward and outwardly away from said container in a vertical plane passing through a vertical center line of said container and containing opposing pivot points of attachment of said handle;
   b. a second leg having a first end and a second end with said first end attached to said container opposite said first leg and said second leg extending first downward and outwardly away from said container in said vertical plane and then downward and away from said vertical plane; and
   c. a third leg having a first end and a second end with said first end of said third leg pivotally attached to said second leg and said third leg extending downward and away from both said vertical plane and said second end of said second leg with a portion of said third leg below said pivotal attachment being longer than a portion of said second leg below said pivotal attachment of said third leg.

* * * * *